(12) United States Patent
Dupouy et al.

(10) Patent No.: US 7,399,510 B2
(45) Date of Patent: Jul. 15, 2008

(54) MINERAL FIBRE-BASED SANDWICH STRUCTURE AND METHOD FOR THE PRODUCTION THEREOF

(75) Inventors: Valerie Dupouy, La Chapelle en Serval (FR); Jean-Pierre Maricourt, Avignon (FR)

(73) Assignee: Saint-Gobain Isover, Courbevoie (FR)

( * ) Notice: Subject to any disclaimer, the term of this patent is extended or adjusted under 35 U.S.C. 154(b) by 191 days.

(21) Appl. No.: 10/565,206

(22) PCT Filed: Jul. 13, 2004

(86) PCT No.: PCT/FR2004/001840

§ 371 (c)(1),
(2), (4) Date: Jan. 20, 2006

(87) PCT Pub. No.: WO2005/019124

PCT Pub. Date: Mar. 3, 2005

(65) Prior Publication Data

US 2006/0228522 A1    Oct. 12, 2006

(30) Foreign Application Priority Data

Jul. 23, 2003    (FR) ................................. 03 08976

(51) Int. Cl.
*B32B 3/18* (2006.01)
*B32B 5/08* (2006.01)

(52) U.S. Cl. ............................. 428/55; 428/74; 428/75; 156/256; 156/264

(58) Field of Classification Search ................... 428/74, 428/75, 56, 55; 52/406.1, 406.2; 156/256, 156/264
See application file for complete search history.

(56) References Cited

U.S. PATENT DOCUMENTS 5,776,580 A * 7/1998 Rasmussen et al. ........... 428/74

FOREIGN PATENT DOCUMENTS

| EP | 0 407 264 | 1/1991 |
|----|-----------|--------|
| EP | 0 434 536 | 6/1991 |
| EP | 0 449 414 | 10/1991 |
| EP | 0 493 159 | 7/1992 |
| FR | 2 745 597 | 9/1997 |
| WO | 95/04453 | 2/1995 |
| WO | 96/26310 | 8/1996 |
| WO | 01/38245 | 5/2001 |

* cited by examiner

*Primary Examiner*—Alexander Thomas
(74) *Attorney, Agent, or Firm*—Oblon, Spivak, McClelland, Maier & Neustadt, P.C.

(57) ABSTRACT

A sandwich structure (2) comprising a core (20) and two facings (21, 22) between which the core is placed, the core (20) being formed from a mineral-fiber-based product (1) obtained by a process involving internal centrifugation combined with attenuation by a high-temperature gas stream, characterized in that the mineral fibers are crimped.

16 Claims, 3 Drawing Sheets

MINERAL FIBRE-BASED SANDWICH STRUCTURE AND METHOD FOR THE PRODUCTION THEREOF

The invention relates to a sandwich structure comprising a core and two facings between which the core is placed, the core being formed from a mineral-fiber-based product obtained by a process involving internal centrifugation combined with attenuation by a high-temperature gas stream.

These sandwich structures, taking the form of panels, are used for thermal and/or acoustic insulation, while exhibiting particularly high mechanical properties for specific applications requiring such properties. In particular, they are sandwich structures suitable for making up building elements that consequently have to withstand high compressive loads, such as the elements used for the insulation of flat roofs that can be walked upon. This is also the case for structures used as outdoor insulation, these especially having to be able to withstand tearing forces and shear forces created in particular through the action of wind pressure.

To achieve such performance, this type of insulation structure has a core that is generally of high density, for example at least 80 kg/m$^3$.

Such structures are for example known and sold by Rannila, the mineral fibers constituting the core of this product being glass fibers obtained by an internal centrifugation process and sold by Isover Oy.

Also known are the structures from Paroc Oy that are sold under the name PAROC, the core of which is however made of rock wool, the fibers therefore being obtained by external centrifugation. Furthermore, although these structures are effective from the standpoint of compressive strength and shear strength, they are even heavier products, with a density of around 85 to 120 kg/m$^3$, the performance quality being higher the heavier the product.

Now, it is always desirable to improve the performance of such structures, while not increasing their weight.

This is just the object of the invention, namely to provide mineral fiber sandwich structures whose desired performance characteristics as regards mechanical strength (compressive strength and shear strength) is achieved without making them heavier, and even by achieving lower densities than those existing on the market. At the same time, the lower densities of these structures compared with those of the prior art allow thermal performance to be improved.

According to the invention, the sandwich structure comprising a core and two facings between which the core is placed, the core being formed from a mineral-fiber-based product obtained by a process involving internal centrifugation combined with attenuation by a high-temperature gas stream, is characterized in that the mineral fibers are crimped.

The "crimping" of the fibers is an operation carried out after the actual fiberizing operation, the aim of this crimping operation being to give the fibers inside the product as varied directions as possible without substantially over modifying the general orientation of the web of fibers resulting from the centrifugation. This operation consists especially in passing the web of fibers between two series of conveyors that define its upper and lower faces and in applying longitudinal compression resulting from the web passing from a pair of conveyors running at a certain speed V1 to a pair of conveyors running at a speed V2 lower than the first.

Although such an operation is known for manufacturing felts or blankets based on mineral fibers obtained by internal centrifugation, these felts had never been used to manufacture sandwich structures. Surprisingly, it has now turned out that the crimping of the fibers for such structures greatly improves their strength, in particular their compressive strength.

Preferably, the fiber distribution over a section substantially parallel to the surface of the facings has a substantially V-shaped profile.

According to another feature, the core comprises a plurality of juxtaposed lamellae that extend along the main extension of the facings, the lamellae being formed from the product based on crimped mineral fibers.

The lamellae are obtained after the base product has been cut and turned through 90° with respect to the rest plane of the product before cutting. Thus, when the fiber distribution has a V-shaped profile, in the manner of chevrons, the Vs extend over the entire width of the lamellae and the tips of the Vs are substantially aligned. The V-shaped profile fiber distribution is arranged in stacked layers over the entire height of a lamella, and consequently over the entire thickness of the core of the sandwich structure.

By combining a plurality of lamellae of the base product, the crimped base product having been cut and turned through 90° in order to provide each lamella with a fiber distribution as described above, it is thus possible to obtain a core which, sandwiched between two facings, provides unexpected performance characteristics as regards compressive strength and shear strength.

Advantageously, the density of the sandwich structure of the invention is at most equal to 80 kg/M$^3$, preferably between 60 and 70 kg/m$^3$, and in particular equal to 50 kg/m$^3$. For this type of low-density product (less than or equal to 80 kg/m$^3$), the thermal performance characteristics are further improved compared with products of higher density.

According to another feature, the structure has a compressive strength of at least 80 kPa, in particular at least 60 kPa, and a shear strength of at least 80 kPa, in particular at least 60 kPa.

The mineral fibers of this structure are, for example, obtained from the following glass composition in proportions by weight:

| | |
|---|---|
| $SiO_2$ | 57 to 70% |
| $Al_2O_3$ | 0 to 5% |
| CaO | 5 to 10% |
| MgO | 0 to 5% |
| $Na_2O + K_2O$ | 13 to 18% |
| $B_2O_3$ | 2 to 12% |
| F | 0 to 1.5% |
| $P_2O_5$ | 0 to 4% |
| Impurities | <2% | and contain more than 0.1% by weight of phosphorus pentoxide when the weight percentage of alumina is equal to or greater than 1%.

Another glass composition may also be the following in mol %:

| | |
|---|---|
| $SiO_2$ | 55-70 |
| $B_2O_3$ | 0-5 |
| $Al_2O_3$ | 0-3 |
| $TiO_2$ | 0-6 |
| Iron oxides | 0-2 |
| MgO | 0-5 |
| CaO | 8-24 |
| $Na_2O$ | 10-20 |

-continued

|  |  |
|---|---|
| K₂O | 0-5 |
| Fluoride | 0-2 |

Another preferred variant of the glass composition is also the following, in proportions by weight, the alumina content preferably being greater than or equal to 16% by weight:

|  |  |
|---|---|
| SiO₂ | 35-60% |
| Al₂O₃ | 12-27% |
| CaO | 0-35% |
| MgO | 0-30% |
| Na₂O | 0-17% |
| K₂O | 0-17% |
| R₂O (Na₂O + K₂O) | 10-17% |
| P₂O₅ | 0-5% |
| Fe₂O₃ | 0-20% |
| B₂O₃ | 0-8% |
| TiO₂ | 0-3% |

According to yet another feature, the facings of the sandwich structure are made of sheet metal, possibly perforated. Their thickness is less than 1 mm, preferably around 0.4 to 0.8 mm.

Advantageously, the sandwich structure is used as a thermal and/or acoustic insulation panel, of the roof, partition or wall-cladding panel type.

Furthermore, the process for manufacturing such a structure is characterized in that it consists in:
 delivering, on a plane (P), a product based on mineral fibers obtained by an internal centrifugation process;
 crimping the product;
 cutting the crimped product into lamellae, preferably along the greatest extent of the crimped product;
 turning the lamellae through 90° with respect to the plane (P); and
 juxtaposing the lamella and assembling them between the two facings.

According to one feature of the process, the fibers of the product are crimped by means of a crimping unit comprising at least a first pair and a second pair of conveyors between which the product runs in order to be compressed both longitudinally and in its thickness, which conveyors have speeds V1 and V2 respectively, the ratio of the speeds R=V1/V2 being greater than or equal to 3, and preferably equal to 3.5, and also compression means that reduce the product to its final thickness e, the H/e ratio being greater than or equal to 1.2, and preferably equal to 1.6, H corresponding to the height between the conveyors of the second pair.

Finally, the invention relates to a method of construction using at least one architectural insulation element, of the roof, partition or wall-cladding panel type, characterized in that the architectural insulation element is formed by assembling sandwich structures according to the invention. The sandwich structures are butted and joined together by interlocking of their ends, which have mutually cooperating shapes.

Other advantages and features of the invention will now be described in greater detail with regard to the appended drawings in which:

FIG. 1 illustrates a thermal and/or acoustic insulation sandwich structure 2 intended to be used for the construction of walls for outdoor walls, wall claddings, partitions or ceilings of buildings.

Figure 1:
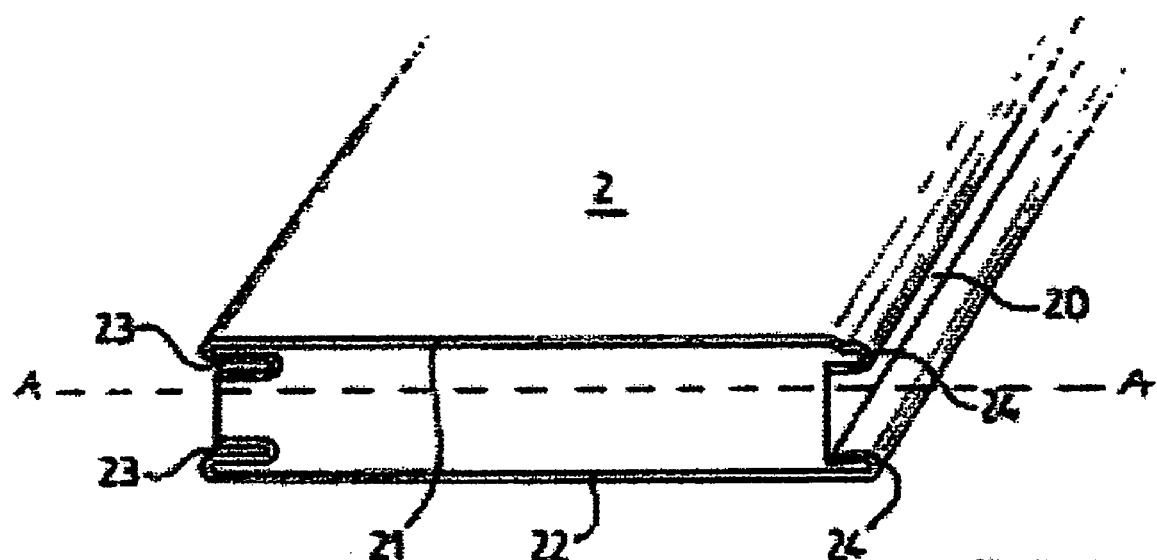
FIG. 1 is a partial side view of a sandwich structure according to the invention.

The sandwich structure 2 comprises a core 20 and two facings 21 and 22 fastened to the core, for example by adhesive bonding.

The facings 21 and 22 are generally made of sheet metal and may optionally be perforated, in particular when they are to provide acoustic insulation. They have profiled ends 23, 24 suitable for assembling, by mutual cooperation, a structure with other sandwich structures and allowing them to be fixed to the framework of the building or to the metal rails associated with the framework of the building. Thus, the end 23 has a female part, such as a groove, whereas the other end has a male part 24 that is intended to fit into the female part of an adjacent structure.

Figure 2:
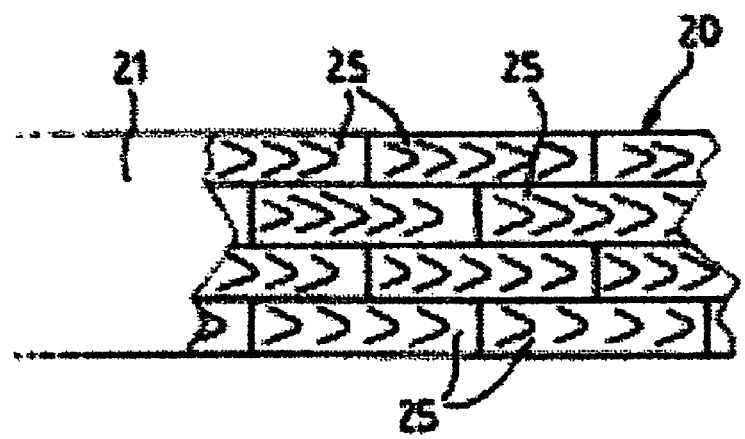
FIG. 2 is a partial top view in cross section on the line A-A of FIG. 1.
Figure 5:
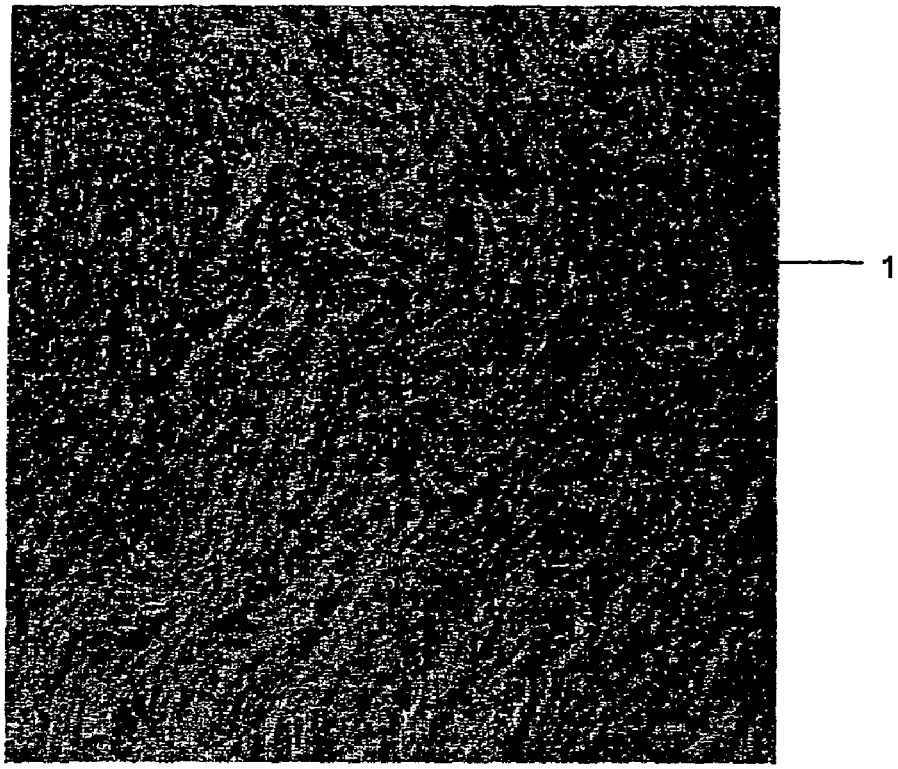
FIG. 5 is a photograph of a specimen of a product based on mineral fibers crimped in a standard fashion, intended for a sandwich structure according to the invention.

The core 20 visible in FIG. 2 comprises a plurality of lamellae 25 produced from a product 1 based on crimped mineral fibers (FIGS. 5 et 6).

Figure 4:
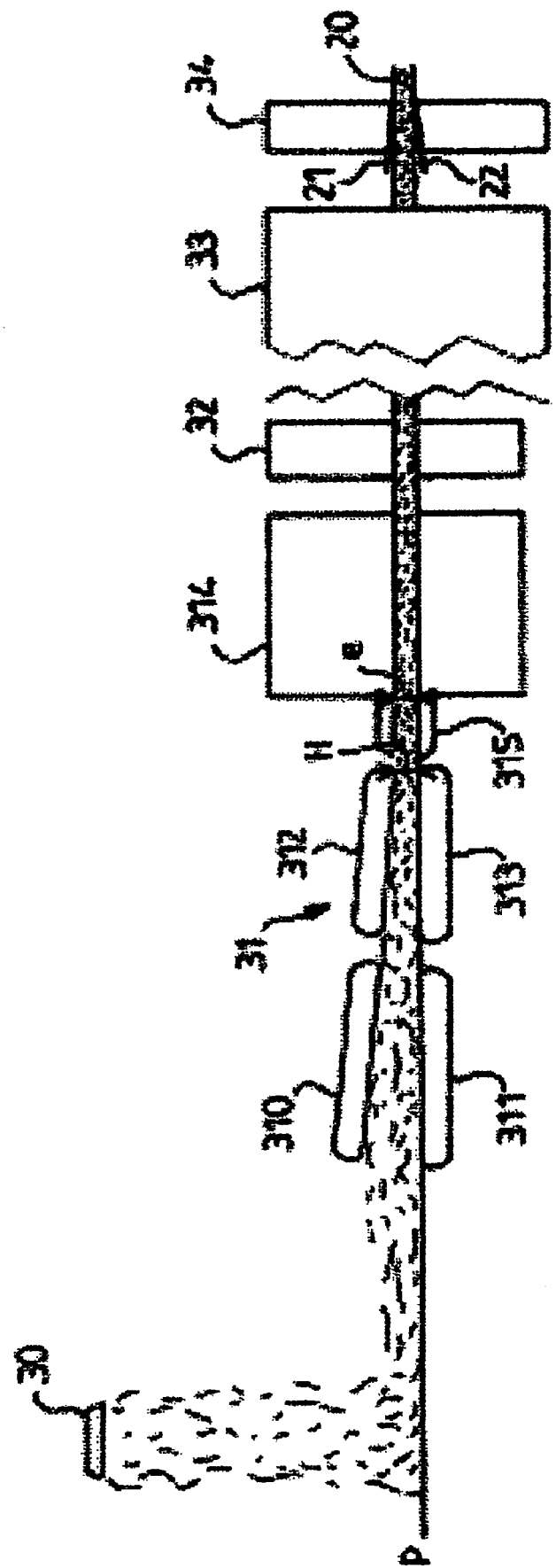
FIG. 4 illustrates schematically a plant for manufacturing a sandwich structure according to the invention.

The manufacture of a sandwich structure of the invention is given below, FIG. 4 illustrating schematically this manufacture on a manufacturing line that is not continuous.

The product 1, output by a spinner 30, is delivered onto a plane P in the form of a blanket, which is then crimped using a crimping unit 31—the delivery and crimping steps will be described later.

On leaving the crimping unit, the crimped product 1 is cut into panels by a cutting device 32, of the guillotine type. After cutting, and on another manufacturing line using suitable means 33, the panels are cut up, for example using circular saws, preferably along the longitudinal direction, into lamellae 25 of given size, these lamellae then being turned through 90° with respect to the plane P and combined with one another by compression. The lamellae may be arranged in various ways, for example being compressed one row against another with the same length, or for example by being butted with different lengths to form a row and compressed against one another, being offset as illustrated in FIG. 2.

Once the lamellae have been combined to form the core 20, the operation of combining the core with the two facings is carried out using an assembly device 34. If the core is fastened to the two facings 21 and 22 by adhesive bonding, its opposed surfaces that face the facings are coated with adhesive before the insertion of the core between the two facings, the whole assembly then undergoing a compression and curing operation.

The mineral fibers of the product 1 are, for example, glass fibers. The glass compositions used for the product 1 may be of various types. The reader may refer for examples of compositions to those described in patent EP 0 399 320-B2 and patent application EP 0 412 878, or to patent applications WO 00/17117 and WO 01/68546 which in particular describe an alumina content greater than or equal to 12% by weight and preferably greater than or equal to 16% by weight. The latter compositions, with a high alumina content, advantageously provide better ageing of the product 1 and therefore of the sandwich structure.

The product 1 of the core is obtained as mentioned above by internal centrifugation and attenuation, by a high-temperature gas stream, of molten glass and by crimping of the fiber blanket obtained after the spinning operation.

The process for forming fibers by internal centrifugation and attenuation consists, in a known manner, in introducing a stream of molten glass into a spinner, also called a spinner dish, rotating at high speed and pierced around its periphery by a very large number of holes through which the glass is projected in the form of filaments owing to the effect of the centrifugal force. These filaments are then subjected to the action of an annular high-temperature/high-velocity attenuation stream hugging the wall of the spinner, which stream attenuates the filaments and converts them into fibers. The fibers formed are entrained by this attenuation gas stream toward a collection device, generally consisting of a gas-permeable belt on which the fibers are entangled in the form of a blanket on a plane P.

Next, the fibers are conveyed to the crimping unit 31. The fiber blanket undergoes a compression operation, which is carried out by making a pass between several pairs of conveyors, for example two pairs, 310, 311 and 312, 313 respectively, the distance separating two conveyors located on either side of the blanket decreasing in the direction of advance of said blanket.

The speed of each pair of conveyors is less than that of the preceding pair of conveyors, which brings about a longitudinal compression of the blanket. Thus, the pairs of conveyors 310, 311; 312, 313 have a speed V1 and a speed V2, respectively, with a speed ratio R=V1/V2 that is adapted according to the desired final crimping.

Although the speed ratio R is, in the standard process, around 3, it may be preferred to increase this ratio so that it is around 3.5.

The crimped product is then introduced into an oven 314 for its heat treatment. It is held therein right from its entry by means of compression 315 to its final thickness e.

The height H between the last two conveyors 312, 313 depends on the final thickness e that the product leaving the oven has to have. Although in the standard process the H/e ratio is equal to 1.2, it may be preferable for this to be increased, and be greater than 1.5, preferably equal to 1.6.

The standard crimping characteristics, that is to say R=3 and H/e=1.2, result in a crimped product 1 whose fibers are oriented randomly and multidirectionally and form a diversity of loops depending on the thickness of the product (FIG. 5).

Figure 6:
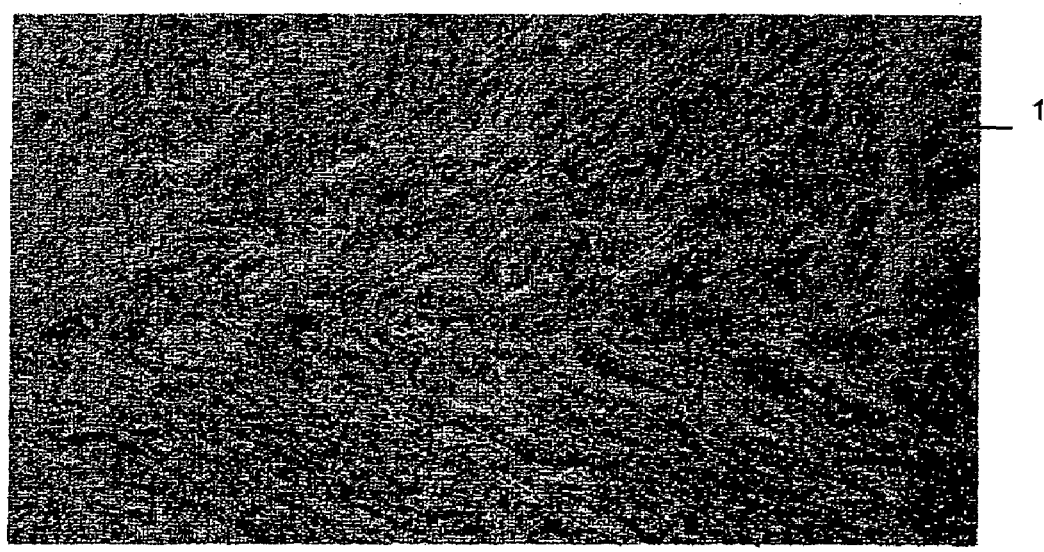
FIG. 6 is a photograph of a specimen of a product with a particular crimping arrangement, intended for a sandwich structure according to the invention.

The abovementioned preferred crimping characteristics, i.e. R=3.5 and H/e=1.6, make it possible to obtain a product 1 whose fibers are oriented in a particular manner, as illustrated in FIG. 6, more precisely in a substantially V-shaped profile distribution in the manner of chevrons (the dotted lines have been added in the figure), the V extending over the entire thickness of the crimped product and the tips of the Vs lying substantially along a line parallel to the run direction of the blanket.

Surprisingly, as we will see in the rest of the description, it has turned out that, with this particular crimping arrangement, the performance characteristics of the sandwich structures as regards compressive strength and shear strength are even better than with a standard crimping arrangement, although the latter does provide satisfactory results in the case of sandwich structures produced according to the invention, compared with the current commercial practice of using uncrimped products based on mineral wool obtained by internal centrifugation, which are intended for sandwich structures.

Once the crimped product 1 has been incorporated into a sandwich structure, the V-shaped profile of the fiber distribution is then substantially parallel to the surface of the facings 21, 22 (FIG. 2), a V extending over the entire width of a lamella and the tips of the Vs being substantially aligned. This V-shaped profile can be seen only in a top view and in cross section of the core in a plane parallel to the facings.

Figure 3:
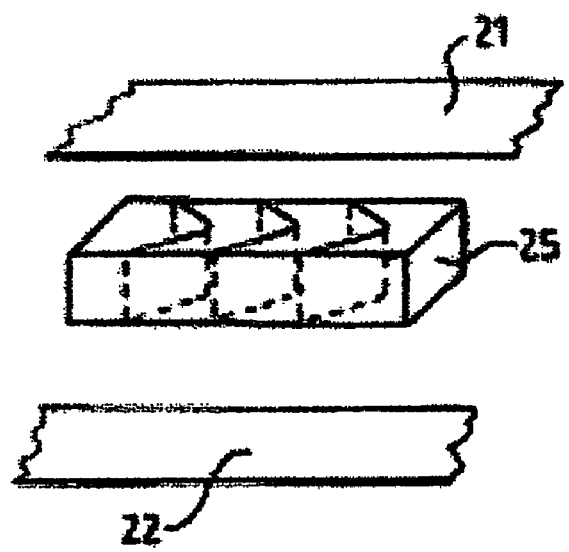
FIG. 3 is a partial, exploded side view of FIG. 1.

The V-profile fiber distribution is arranged in stacked layers over the entire height of a lamella (FIG. 3), and consequently over the entire thickness of the core of the sandwich structure.

Thus, the crimping step following the formation of fibers by internal centrifugation makes it possible to manufacture sandwich structures or panels, in particular with a density of 65 kg/M$^3$, which is less than that of existing panels, and therefore lighter than, for example, panels from Paroc Oy with the reference PAROC 75C or 50C that are manufactured from products based on mineral fibers obtained by external centrifugation, while still obtaining compressive strength and shear strength properties that are just as effective, and even more effective.

Illustrated below is a table that compares the core of two sandwich structures of the invention with those of other sandwich structures. This table demonstrates the advantage of crimping the fibers after they have been obtained by internal centrifugation.

Examples 1 to 4 correspond to core specimens (with a thickness of 80 mm) for sandwich structures or panels. The density of the core, its compressive strength, its shear strength and its thermal conductivity λ are given.

Example 1 (Ex1) corresponds to a core for a sandwich panel manufactured according to the invention from a blanket of glass fibers obtained therefore by internal centrifugation and by crimping as explained above, with the preferred crimping characteristics (R=3.5 and H/e=1.6), the fiber distribution having a V-shaped profile.

Example 1a (Ex1a) corresponds to a core for a sandwich panel manufactured according to the invention from a blanket of glass fibers obtained therefore by internal centrifugation and by crimping as explained above, with standard crimping characteristics (R=3 and H/e=1.2).

Example 2 (Ex2) corresponds to a core for a sandwich panel sold by Rannila and manufactured from a blanket of glass fibers obtained by internal centrifugation but without crimping, these being sold by Isover Oy.

Examples 3 and 4 (Ex3 and Ex4) correspond to cores for sandwich panels manufactured specifically by the Applicant for the purpose of the application, so as to carry out comparative tests with the cores for the sandwich panels manufactured according to the invention. These are panels manufactured from a blanket of glass fibers obtained by internal centrifugation but without crimping. They are therefore similar in their manufacture to Example 2, only the density changing.

The measurements given for these examples were obtained on lamellae of the core of a sandwich panel before the facings are joined to the core, these lamellae being positioned as arranged in the final structure (turned through 90° with respect to the rest plane of the blanket during cutting of the lamellae).

The compressive strength measurements were carried out according to the EN 826 standard on 1 dm$^2$ specimens.

The shear strength measurements were carried out according to the EN 12090 standard on specimens of lamellae 200 mm in length.

The thermal conductivity measurements were carried out according to the EN 3162 standard on a 600 mm×600 mm specimen made up from a plurality of lamellae clamped against one another.

Examples 5 and 6 correspond to cores for sandwich panels manufactured by Paroc Oy under the names PAROC 50C (Ex5) and PAROC 75C (Ex6) respectively, with two different respective densities for the core. The core was manufactured from rock wool fiber blankets obtained by an external centrifugation process, and not an internal centrifugation process as in the case of the invention, and by a crimping process.

The compressive strength, the shear strength and the thermal conductivity of these examples are given as described in the publication "CERTIFICATE No. 3/96 (date of issue: Sep. 30, 1996)" for the "PAROC sandwich panels for external walls, partitions and ceilings" product from the manufacturer "Paroc Oy Panel Systems, Finland".

| | Examples | | | | | | |
|---|---|---|---|---|---|---|---|
| | Ex 1 | Ex 1a | Ex 2 | Ex 3 | Ex 4 | Ex 5 | Ex 6 |
| Density (kg/m$^3$) | 65 | 65 | 80 | 70 | 65 | 85 | 115 |
| Compressive strength (kPa) | 110 | 90 | 80 | 65 | 60 | 60 | 105 |
| Shear strength (kPa) | 80 | 55 | 110 | 80 | 80 | 54 | 81 |
| Thermal conductivity λ (mW/m · K) | 40.5 | 40.5 | 43 | 41.5 | 40.5 | 41 | 45 |

The following conclusions may be drawn from this table:
- The cores of the structures manufactured according to the invention, and therefore obtained from mineral wool using an internal centrifugation and crimping process (Examples 1 and 1a), exhibit better performance as regards compressive strength than the structures manufactured from mineral wool using an internal centrifugation process and no crimping (Examples 2 to 4). Furthermore, these structures of Examples 1 and 1a have the advantage of a lower density. Finally, for an equivalent density (Examples 1 and 4), the shear strength with the preferred crimping characteristics for the crimped product of the invention remains as good as that from an uncrimped product, while substantially increasing the compressive strength;
- The cores of the structures manufactured according to the invention, obtained from mineral wool using an internal centrifugation and crimping process (in particular Example 1) exhibit better performance as regards compressive strength and shear strength than the structures manufactured from mineral wool using an external centrifugation process with crimping and with a higher density (Examples 5 and 6);
- The cores of the structures of the invention thus advantageously have a lower density than the cores of the structures that may in particular exist on the market (Example 1 compared with Example 6) for equivalent performance with regard to compressive strength and shear strength. This also results in improved thermal performance by the reduction in thermal conductivity (from 45 mW/m.K in the case of Example 6 to 40 mW/m.K in the case of Example 1).

The invention claimed is:

1. A sandwich structure comprising a core and two facings between which the core is placed, the core being formed from a mineral-fiber-based product obtained by a process involving internal centrifugation combined with attenuation by a high-temperature gas stream, characterized in that the mineral fibers are crimped and the fiber distribution over a section substantially parallel to the surface of the facings has a substantially V-shaped profile, the V-shaped profile of the fiber distribution extends over the entire width of the lamellae and the tips of the Vs are substantially aligned.

2. The sandwich structure as claimed in claim 1, wherein the core comprises a plurality of juxtaposed lamellae that extend along the main extension of the facings, the lamellae being formed from the product based on crimped mineral fibers.

3. The sandwich structure as claimed in claim 2, which has a compressive strength of at least 60 kPa.

4. The sandwich structure as claimed in claim 1, which has a density of at most equal to 80 kg/m$^3$.

5. The sandwich structure as claimed in claim 4, which has a compressive strength of at least 60 kPa.

6. The sandwich structure as claimed in claim 1, which has a compressive strength of at least 60 kPa.

7. The sandwich structure as claimed in claim 1, which has a shear strength of at least 60 kPa.

8. The sandwich structure as claimed in claim 1, wherein the mineral fibers are obtained from a glass composition in proportions by weight comprising: $SiO_2$ in an amount of 57 to 70%; $Al_2O_3$ in an amount of 0 to 5%; CaO in an amount of 5 to 10%; MgO in an amount of 0 to 5%; $Na_2O+K_2$) in an amount of 13 to 18%; $B_2O_3$ in an amount of 2 to 12%; F in an amount of 0 to 1.5%; $P_2O_5$ in an amount of 0 to 4%; impurities in an amount less than 2%
and contain more than 0.1% by weight of phosphorus pentoxide when the weight percentage of alumina is equal to or greater than 1%.

9. The sandwich structure as claimed in claim 1, wherein the mineral fibers are obtained from a glass composition in mol % comprising: $SiO_2$ in an amount of 55-70; $B_2O_3$ in an amount of 0-5; $Al_2O_3$ in an amount of 0-3; $TiO_2$ in an amount of 0-6; Iron oxides in an amount of 0-2; MgO in an amount of 0-5; CaO in an amount of 8-24; $Na_2O$ in an amount of 10-20; $K_2O$ in an amount of 0-5; Fluoride in an amount of 0-2.

10. The sandwich structure as claimed in claim 1, wherein the mineral fibers are obtained from a glass composition in percentages by weight comprising, $SiO_2$ in an amount of 35-60%; $Al_2O_3$ in an amount of 12-27%; CaO in an amount of 0-35%; MgO in an amount of 0-30%; $Na_2O$ in an amount of 0-17%; $K_2O$ in an amount of 0-17%; $R_2O$ ($Na_2O+K_2O$) in an amount of 10-17%; $P_2O_5$ in an amount of 0-5%; in an amount of $Fe_2O_3$ in an amount of 0-20%; $B_2O_3$ in an amount of 0-8%; and $TiO_2$ in an amount of 0-3%.

11. The sandwich structure as claimed in claim 10, wherein the alumina content is greater than or equal to 16% by weight.

12. The sandwich structure as claimed in claim 1, wherein the facings are made of sheet metal.

13. A process for manufacturing a structure of claim 1, comprising:
   delivering, on a plane (P), a product based on mineral fibers obtained by an internal centrifugation process;
   crimping the product;
   cutting the crimped product into lamellae;
   turning the lamellae through 90° with respect to the plane (P); and
   juxtaposing the lamella and assembling them between the two facings.

14. The process as claimed in claim 13, wherein the fibers of the product are crimped by with a crimping unit comprising at least a first pair and a second pair of conveyors between which the product runs in order to be compressed both longitudinally and in its thickness, which conveyors have speeds V1 and V2 respectively, the ratio of the speeds R=V1/V2 being greater than or equal to 3, and also a compressor that reduce the product to its final thickness e, the H/e ratio being greater than or equal to 1.2, H corresponding to the height between the conveyors of the second pair.

15. A method of constructing at least one architectural insulation element, of the roof, partition or wall-cladding panel, wherein the at least one architectural insulation element is formed by assembling sandwich structures as claimed in claim 1.

16. The method of construction as claimed in claim 15, wherein the sandwich structures are butted and joined together by interlocking of their ends, which have mutually cooperating shapes.

* * * * *